(12) United States Patent
Unger et al.

(10) Patent No.: US 9,773,339 B2
(45) Date of Patent: Sep. 26, 2017

(54) VIEW DIRECTION DETERMINATION

(71) Applicant: Microsoft Technology Licensing, LLC, Redmond, WA (US)

(72) Inventors: Markus Unger, Graz (AT); Konrad Karner, Raaba (AT); Blaise Aguera y Arcas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/818,508

(22) Filed: Aug. 5, 2015

(65) Prior Publication Data

US 2015/0339843 A1    Nov. 26, 2015

Related U.S. Application Data

(63) Continuation of application No. 13/729,647, filed on Dec. 28, 2012, now Pat. No. 9,135,742.

(51) Int. Cl.

| | |
|---|---|
| *G09G 5/00* | (2006.01) |
| *G06T 15/00* | (2011.01) |
| *G06K 9/00* | (2006.01) |
| *G06K 9/32* | (2006.01) |
| *G06K 9/36* | (2006.01) |
| *G06F 17/00* | (2006.01) |
| *G06T 15/04* | (2011.01) |
| *G06T 15/10* | (2011.01) |

(52) U.S. Cl.
CPC .............. *G06T 15/04* (2013.01); *G06T 15/10* (2013.01); *G06T 2215/08* (2013.01)

(58) Field of Classification Search
CPC combination set(s) only.
See application file for complete search history.

(56) References Cited

U.S. PATENT DOCUMENTS

| | | |
|---|---|---|
| 6,184,888 B1 | 2/2001 | Yuasa et al. |
| 6,433,789 B1 | 8/2002 | Rosman |
| 6,606,089 B1 | 8/2003 | Margadant |
| 6,693,964 B1 | 2/2004 | Zhang et al. |

(Continued)

OTHER PUBLICATIONS

U.S. Appl. No. 13/729,424, Amendment and Response filed Sep. 16, 2015, 27 pgs.

(Continued)

*Primary Examiner* — Wesner Sajous (57) ABSTRACT

Among other things, one or more techniques and/or systems are provided for defining a view direction for a texture image used to texture a geometry. That is, a geometry may represent a multi-dimensional surface of a scene, such as a city. The geometry may be textured using one or more texture images depicting the scene from various view directions. Because more than one texture image may contribute to texturing portions of the geometry, a view direction for a texture image may be selectively defined based upon a coverage metric associated with an amount of non-textured geometry pixels that are textured by the texture image along the view direction. In an example, a texture image may be defined according to a customized configuration, such as a spherical configuration, a cylindrical configuration, etc. In this way, redundant texturing of the geometry may be mitigated based upon the selectively identified view direction(s).

20 Claims, 9 Drawing Sheets

(56) References Cited

U.S. PATENT DOCUMENTS

| | | | |
|---|---|---|---|
| 6,750,873 | B1 | 6/2004 | Bernardini et al. |
| 7,372,990 | B2 | 5/2008 | Yamauchi et al. |
| 7,453,455 | B2 | 11/2008 | Park et al. |
| 7,714,855 | B2 | 5/2010 | Brabec et al. |
| 7,956,870 | B2 | 6/2011 | Snyder et al. |
| 8,284,237 | B2 | 10/2012 | Chen et al. |
| 8,395,619 | B1 | 3/2013 | Diard |
| 9,135,742 | B2 | 9/2015 | Unger et al. |
| 2002/0080143 | A1 | 6/2002 | Morgan et al. |
| 2004/0032980 | A1 | 2/2004 | Harman |
| 2004/0252892 | A1 | 12/2004 | Yamauchi et al. |
| 2006/0067573 | A1 | 3/2006 | Parr et al. |
| 2006/0284880 | A1* | 12/2006 | Zhou ............... G06T 15/04 345/582 |
| 2008/0247668 | A1 | 10/2008 | Li |
| 2009/0060273 | A1* | 3/2009 | Stephan ............ G06K 9/42 382/103 |
| 2010/0289798 | A1* | 11/2010 | Furuta ............. G06T 9/00 345/419 |
| 2010/0290712 | A1* | 11/2010 | Furuta ............. G06T 15/04 382/244 |
| 2010/0315412 | A1 | 12/2010 | Sinha |
| 2011/0115886 | A1 | 5/2011 | Nguyen |
| 2011/0267344 | A1 | 11/2011 | Germann et al. |
| 2012/0039528 | A1 | 2/2012 | Lee et al. |
| 2012/0269457 | A1 | 10/2012 | Vetro et al. |
| 2012/0299920 | A1 | 11/2012 | Coombe et al. |
| 2012/0314040 | A1 | 12/2012 | Kopf et al. |
| 2013/0100132 | A1 | 4/2013 | Katayama et al. |
| 2013/0300740 | A1 | 11/2013 | Snyder et al. |
| 2014/0023293 | A1 | 1/2014 | Liang |
| 2014/0184585 | A1 | 7/2014 | Unger et al. |
| 2014/0184596 | A1 | 7/2014 | Unger et al. |
| 2014/0267343 | A1 | 9/2014 | Arcas et al. |
| 2014/0267587 | A1 | 9/2014 | Arcas et al. |
| 2016/0071306 | A1 | 3/2016 | Unger et al. |

OTHER PUBLICATIONS

U.S. Appl. No. 13/729,424, Office Action mailed Jan. 14, 2016, 35 pgs.
Turk, Greg, and Marc Levoy, "Zippered polygon meshes from range images", Proceedings of the 21st annual conference on Computer graphics and interactive techniques. ACM, Jul. 24-29, 1994, 8 pgs.
Bernandini, F. et al., "The 3D Model Acquisition Pipeline", Jun. 2002, Computer Graphics Forum, Wiley-Blackwell Publishing Ltd., vol. 21, No. 2, 24 pgs.
Chaurasia, Olga Sorkine et al., "Silhouette-Aware Warping for Image-Based Rendering", Jun. 27, 2011, Eurographics Symposium on Rendering, vol. 30, No. 4, 10 pgs.
Colombari, "Image-Based Techniques for View Synthesis and Video Editing", Apr. 11, 2006, reprinted from the Internet at: http://citeseerx.isl.psu.edu/viewdoc/summary?doi=10.1.1.102. 8303, 125 pgs.
Fehn, C. et al., "An Evolutionary and Optimised Aproach", Sep. 2002, Internet Citation, In Proceedings of International Broadcast Conference, 8 pgs.
Fitzgibbon, et al., "Image-Based Rendering Using Image-Based Priors", Retrieved at <<http://window.stanford.edu/courses/cs448a-06-winter/fitzgibbon-priors-iccv03.pdf>>, In International Journal of Computer Vision 63(2), Feb. 2005, pp. 11.
Fruh, Christian, and Avideh Zakhor. "Constructing 30 city models by merging aerial and ground views." Computer Graphics and Applications, IEEE 23.6 (2003): 52-61.
Goddard, "A Small Shadow Map Improvement", Aug. 23, 2012, reprinted from the Internet at: http://blog.gradientstudios.com/2012/08/23/shadow-map-improvement/, 6 pgs.
Herrman, "Entire City Rendered in 3D Using Nothing but Flickr Photos", Sep. 18, 2009, reprinted from the Internet at: http://gizmodo.com/5362578/entire-city-rendered-in-3d-using-nothing-but-ftickr-photos, 2 pgs.
Hornung, et al., "Interactive Pixel-Accurate Free Viewpoint Rendering from Images with Silhouette Aware Sampling", Retrieved at <<http://www.ahornung.net/files/pub/Hornung_CGF09.pdf, In Computer Graphics Forum, vol. 28, Issue 8, Jun. 9, 2009, pp. 13.
Magnor, Marcus Andreas, "Geometry-Adaptive Multi-View Coding Techniques for Image-Based Rendering", proceedings of a dissertation, retrieved Nov. 6, 2012, 144 pgs.
PCT Int. Search Report cited in PCT Application No. PCT/US2013/077737 dated May 20, 2014, 10 pgs.
PCT Reply Written Opinion cited in PCT Application No. PCT/US2013/077737 dated Mar. 12, 2015, 9 pgs.
PCT Written Opinion cited in PCT Application No. PCT/US2013/077737 dated Jan. 12, 2015, 5 pgs.
Po, Lai-Man et al., "A New Multidirectional Extrapolation Hole-Filling Method for Depth-Image-Based Rendering", 2011, 18th IEEE International Conference on Image Processing, 4 pgs.
Popescu, Voicu, et al., "The Vacuum Buffer", Nov. 6, 2012, reprinted from the Internet at: https://www.google.com/search?sourceid=navclient&aq=&oq=The+Vacuum D+Buffer&ie=UTF8&rlz=1T4ADRA_enUS455US456 &q=The+Vacuum+Buffer&gs_I32 hp....0.0.0.2890..........0. 8 pgs.
Proceedings of a Dissertation, 2000, reprinted from the Internet at: http://www.google.com/url?sa=t&rct=j&q=&esrc=s&frm=1 &source=web&cd=1&ved=OCC8QFjAA&url=http%3A %2F%2 Fwww.mpi-inf.mpg.de% D2F-magnor%2Fpublications%2Fdiss. pdf&ei=4t3eUu-YEWbygGHIYCABA &usg=AFQjCNEyhIRKtzzTyT32nxwNAQA3uZz_uw&bvm=bv. 59568121,d.aWc, 144 pgs.
Pulli, et al., "View-based Rendering: Visualizing Real Objects from Scanned Range and Color Data", In Eurographics Rendering Workshop, Jun. 16, 1997, pp. 13.
Rumpler et al., "Rapid 3D City Model Approximation from Publicly Available Geographic Data Sources and Georeferenced Aerial Images", Feb. 2012 in the Proceedings 17th Computer Vision Winter Workshop, Mala Nedelja, Slovenia, 8 pgs.
Shum et al., "A Review of Image-based Rendering Techniques", Jun. 2000, Proceedings of Visual Communications and Image Processing (VCIP), reprinted from the Internet at: www.charlesneedham.com/pubs/68826/revieimage_rendering.pdf, 12 pgs.
Sinha et al., "Image-Based Rendering for Scenes with Reflections", 2012, In the proceedings of ACM Transactions on Graphics, reprinted from the Internet at: hllps://www.google.com/search?sourceid=navclient&aq=&oq=&ie=UTF-8 &rlz=1T4ADRA_enUS455US456 &q=imagebased+rendering+for+scenes+with+reflections&gsl=hp.. 0.411675.0.0.0.4765 .......... 0., 10 pgs.
Sun, Xiaoyong, "Scene Representation and View Synthesis in Image-Based Rendering", Dec. 2007, Proceedings of a Thesis submitted to the University of Ottawa, reprinted from the Internet, 178 pgs.
U.S. Appl. No. 13/729,392, Amendment and Response filed Apr. 6, 2015, 15 pgs.
U.S. Appl. No. 13/729,392, Notice of Allowance mailed May 13, 2015, 5 pgs.
U.S. Appl. No. 13/729,392, Notice of Allowance mailed Aug. 6, 2015, 5 pgs.
U.S. Appl. No. 13/729,392, Office Action mailed Nov. 5, 2014, 14 pgs.
U.S. Appl. No. 13/729,424, Office Action mailed Apr. 23, 2015, 30 pgs.
U.S. Appl. No. 13/729,647, Amendment and Response filed Jan. 23, 2015, 10 pgs.
U.S. Appl. No. 13/729,647, Notice of Allowance mailed Mar. 16, 2015, 5 pgs.
U.S. Appl. No. 13/729,647, Notice of Allowance mailed May 8, 2015, 5 pgs.
U.S. Appl. No. 13/729,647, Office Action mailed Oct. 23, 2014, 11 pgs.
Vangorp, et al., "Perception of Visual Artifacts in Image-Based Rendering of Facades", Retrieved at <<http://www-sop.inria.fr/reves/Basilic/2011/VCLFD11 VCLFD11-paper.pdf>>, Eurographics Symposium on Rendering, vol. 30, No. 4, Jun. 27, 2011, pp. 10.

(56) References Cited

OTHER PUBLICATIONS

Vazquez, et al., "Automatic View Selection Using Viewpoint Entropy and its Application to Image-Based Modelling", Retrieved at http://www.cs.ubc.ca/-heidrich/Papers/Forum.03.pdf>>, In Computer Graphics Forum, 22(4), Mar. 2003, pp. 11.

Vazquez, et al., "On the fly best view detection using graphics hardware", Retrieved at <<http://www.lsi.upc.edu/3~ppau/filesWeb/ontheflyVIIP2004.pdf>>, Proceedings of the Fourth IASTED International Conference on Visualization, Imaging, and Image Processing, Sep. 6, 2004, pp. 6.

Why Hardware Tessellation is Awesome, Nov. 6, 2012, reprinted from the Internet at: http://www.nerdparadise.com/tech/graphics/hardwaretessellation/, 3 pgs.

\* cited by examiner

VIEW DIRECTION DETERMINATION

CROSS-REFERENCE TO RELATED APPLICATIONS

This application is a continuation application of U.S. patent application Ser. No. 13/729,647, filed on Dec. 28, 2012, entitled "VIEW DIRECTION DETERMINATION," now issued U.S. Pat. No. 9,135,742, which application is incorporated herein by reference in its entirety.

BACKGROUND

Many users may interact with image data, such as multidimensional images, generated by a rendering technique. In an example, geometry, such as a digital surface model, may represent a three-dimensional surface of a scene (e.g., a scene depicting a city). Initially, the geometry may comprise one or more non-textured geometry pixels (e.g., a pixel with a depth value, but not a color value). Accordingly, one or more texture images may be used to texture the geometry to create textured geometry (e.g., color values may be assigned to geometry pixels within the geometry based upon one or more texture images). In this way, the scene may be rendered based upon the textured geometry.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for defining a view direction for a texture image used to texture geometry are provided herein. That is, a geometry may comprise a multi-dimensional representation of a scene. It may be appreciated that the scene may illustrate a person, a city, a surface of the earth, a location, a business, a house, a digitally rendered video game character, grass, water, an object, etc. Initially, geometry pixels within the geometry may comprise depth values, but may not comprise texture values, such as color values, for example. Accordingly, the geometry may be textured using one or more texture images that depict the scene from various view directions. It may be advantageous to, as provided herein, selectively identify one or more view directions from which to texture the geometry, such that a number of texture images and/or a number of pixels used to texture the geometry may be reduced, for example. Reducing texture information, such as the amount of texture images and/or pixels, may result in efficient data storage and/or efficient bandwidth utilization during streaming to a client for client-side texturing of the geometry to generate a rendered image, for example.

As provided herein, an initial texture image (e.g., a NADIR texture image depicting a city scene from a plumb-line view direction, such as a top-down view with respect to a ground plane) is applied to a geometry (e.g., a three-dimensional representation of the city scene) to identify a textured portion of the geometry and/or a non-textured portion of the geometry. For example, depth information associated with a geometry pixel, such as a 3D point along a surface of the geometry, may be used to project the geometry pixel to a location of a texture pixel within the initial texture image, such that a color value of the texture pixel may be assigned to (e.g., used to texture) the geometry pixel. The textured portion comprises one or more geometry pixels textured within an undersampling threshold (e.g., an undersampling threshold of 3 may indicate that a texture pixel of the initial texture image may be "stretched" to texture (e.g., cover) up to 3 geometry pixels) by the initial texture image. The non-textured portion comprises one or more geometry pixels that were not textured within the undersampling threshold by the initial texture image (e.g., because the NADIR texture image depicts the city scene from the top-down view, a façade of a building may not be textured by the NADIR texture image and thus may be a non-textured portion of the geometry).

Because the initial texture image may not texture the entire geometry, thus resulting in the non-textured portion, one or more additional texture images, depicting the scene represented by the geometry from various view directions, may be selectively identified for texturing at least a portion of the remaining non-textured geometry pixels (e.g., the geometry may be textured so that up to at least 90% of the geometry pixels are textured). In an example, a first view direction for a first texture image may be defined based upon a first coverage metric associated with an amount of the non-texture portion that is textured, within the undersampling threshold, by the first texture image along the first view direction (e.g., the first coverage metric may indicate that the first view direction provides relatively more texturing coverage of the non-textured portion relative to one or more other view directions). In an example, the first texture image may be defined as a planar texture image, a cylindrical texture image, a spherical texture image, and/or other types of texture images that may provide enhanced texture coverage. In this way, one or more view directions for one or more texture images may be selectively identified to provide desired texture coverage of the geometry. Because a view direction may be selected based upon a coverage metric, a number of texture images and/or a number of pixels used to texture the geometry may be reduced because merely those view directions that provide relatively high non-overlapping texturing coverage may be selectively used to texture the geometry.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

Figure 1:
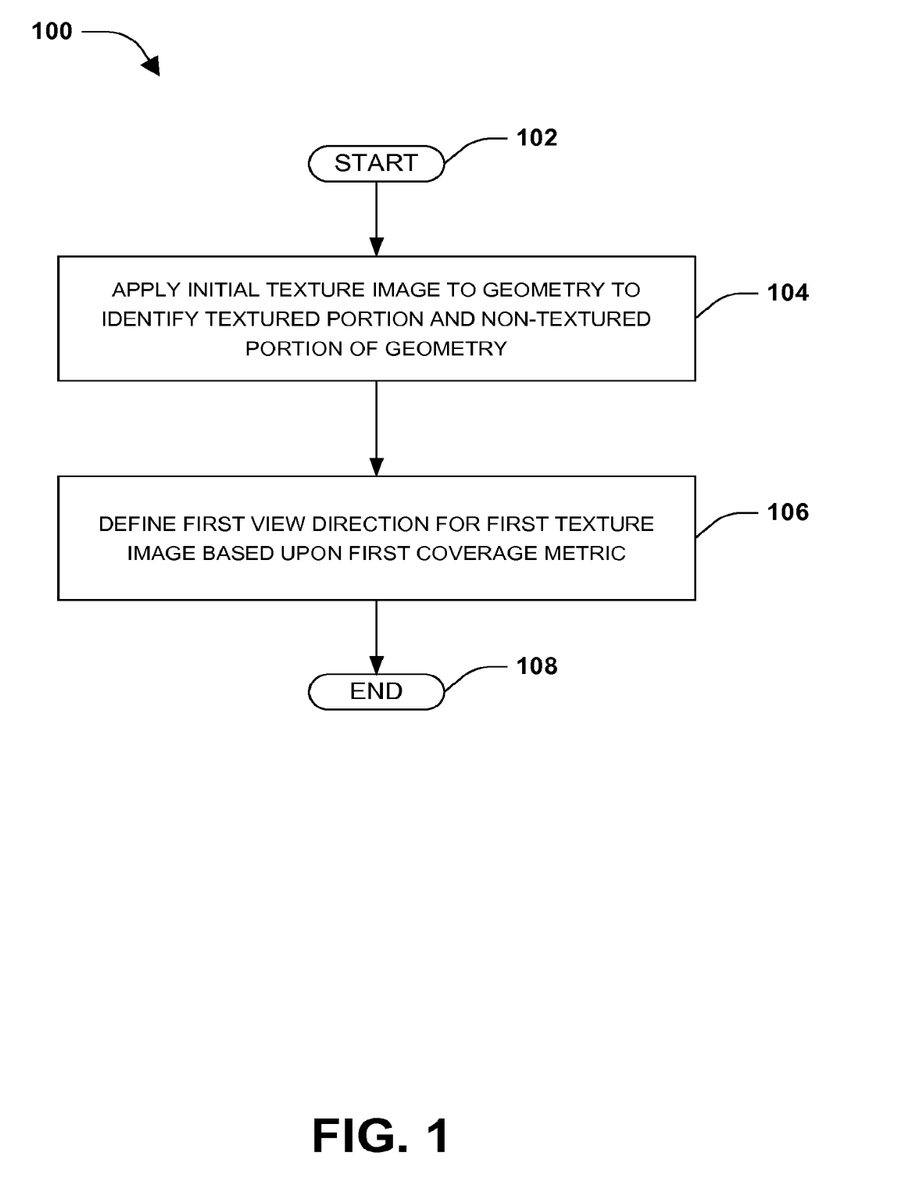
FIG. 1 is a flow diagram illustrating an exemplary method of defining a view direction for a texture image used to texture a geometry.

An embodiment of defining a view direction for a texture image used to texture a geometry is illustrated by an exemplary method 100 of FIG. 1. At 102, the method starts. In an example, the geometry may represent a three-dimensional surface of a scene (e.g., a scene depicting a portion of a city). It may be appreciated that although a scene depicting a portion of a city may be referenced on occasion herein, the instant application is not to be so limited. For example, one or more of the techniques and/or systems described herein may be applied globally (e.g. to an entire city, to the earth, to one or more planets, etc.) and/or may be applied locally to objects and/or surfaces thereof (e.g., a building, a tree, a sign, a car, a stone, etc.). The geometry may comprise one or more geometry pixels having depth values (e.g., at times referred to as 3D points). The geometry may be textured using one or more texture images. In an example, an RGB texture image may comprise one or more pixels having color values and/or depths values (e.g., at times referred to as locations). A 3D point of the geometry may be projected to a location within the RGB texture image during texturing based upon the 3D point and the location having similar depth values. A color value at the location may be assigned to a pixel of the geometry corresponding to the 3D point, thus texturing the pixel to generate a textured geometry pixel. In another example, a texture image may comprise a virtual image that may be generated based upon overlap associated with a projection of one or more texture images onto the geometry. In this way, even though available texture images may not depict the scene from a particular viewpoint, a virtual image depicting the scene from that particular viewpoint may be generated (e.g., by stitching together portions (e.g., one or more pixels) of one or more texture images). It may be appreciated that the geometry may be textured using more than one texture image depicting the scene from various view directions, where some of the different texture images may overlap with one another, at least in part, which may result in a substantial amount of (e.g., unnecessary) storage and/or bandwidth utilization during streaming of such texture images to a client for client-side texturing. Accordingly, as provided herein, one or more view directions may be selectively identified to mitigate storage and/or transfer of redundant data, for example.

At 104, an initial texture image (e.g., a NADIR image depicting the scene represented by the geometry from a plumb-line view direction, such as a top-down view) may be applied to the geometry to identify a textured portion of the geometry and/or a non-textured portion of the geometry. The textured portion of the geometry comprises one or more geometry pixels that are textured within an undersampling threshold by the initial texture image. For example, the NADIR image may depict the city scene from the top-down view, such that geometry pixels, within the geometry, that are not occluded by the top-down view (e.g., building roof-tops, roads, sidewalks, grass, etc.) may be textured by the NADIR image. The undersampling threshold may specify that a single pixel within the NADIR image is allowed to texture up to a particular number of geometry pixels (e.g., a pixel of the initial texture image may be stretched to texture no more than 3 geometry pixels). In this way, the non-textured portion may comprise one or more geometry pixels that are not textured by the initial texture image within the undersampling threshold (e.g., facades of buildings, an inside of a covered bridge, and/or other occluded surfaces of objects). Thus, one or more additional texture images (e.g., a RBG image comprising depth values and color values, a virtual image generated based upon overlap associated with a projection of one or more texture images onto the geometry, etc.) may be used to texture the non-textured portion of the geometry.

At 106, a first view direction for a first texture image may be defined based upon a first coverage metric. The first coverage metric may be associated with an amount of the non-textured portion of the geometry that is textured, within the undersampling threshold, by the first texture image along the first view direction. For example, the first coverage metric may indicate that the first texture image, oriented according to the first view direction, provides relatively more texture coverage (e.g., textures more non-textured geometry pixels of the non-textured portion of the geometry) than other view directions. In an example, a surface orientation histogram may be used to identify the first view direction. That is, the surface orientation histogram may correspond to a histogram of an orientation of a surface normal of untextured geometry (e.g., non-textured geometry pixels). For example, the first view direction may correspond to a theta and a phi that are parameterized for the surface orientation histogram. Theta may represent an azimuthal rotation between 0 to 360 degrees (e.g., a rotational angle around an outer periphery or equator of the city scene, such that 0 degrees may correspond to an eastern looking view, 180 degrees may correspond to a western looking view, and 360 degrees may corresponding to the completion of a circumferential trip around the city scene, for example). Phi may represent an angle between a z axis (e.g., an axis extending from the sky down towards a center portion of the city scene (e.g., NADIR or plumb line axis) and a horizontal plane perpendicular to the z axis (e.g., a ground plane for the city scene). In this way, the surface orientation histogram may be used to identify a fraction of remaining surface area of the scene (e.g., non-textured geometry) that is to be textured by a texture image, such as the first texture image, for example. In an example of utilizing the surface orientation histogram, a greedy algorithm may be used to iteratively select view directions that cover (e.g., texture) a greatest number of non-textured geometry pixels (e.g., relative to other view directions) (e.g., identified using the surface orientation histogram), and then may update the surface orientation histogram based upon newly textured geometry pixels that were textured by a selected view direction, and the process can iterate until a desired number of non-textured geometry pixels are textured. A surface of the scene may be triangulated to identify occlusion (e.g., portions of geometry that are not depicted by the first texture image along the first view direction). In an example, one or more pixels used to texture at least a portion of the non-textured portion may be retained within the first texture image, while one or more pixels not used for texturing (e.g., due to redundant texturing overlap with respect to the initial texture image) may be knocked out (e.g., in-painted) from the first texture image to improve compression and/or storage efficiency. That is, where a geometry pixel of the geometry is textured by a pixel of the initial texture image, a pixel of the first texture image that would otherwise (e.g., redundantly) texture that already textured geometry pixel is knocked out to mitigate data storage and/or bandwidth utilization requirements, for example.

The first texture image may be defined as a planar texture image, a vertical texture image, a cylindrical texture image, a spherical texture image, a virtual image, and/or other types of texture images based upon a surface configuration of an object, depicted within the geometry, that is to be textured by the first texture image. In an example, a vertical texture image may be used to depict a façade of an object (e.g., a relatively tall building) within the geometry from a substantially parallel view direction relative to the façade (e.g., a view looking directly at the side or façade of the building). In another example, a cylindrical texture image may be used to depict a street, a first facade of a first building on a first side of the street, a second façade of a second building on a second side of the street, and/or other portions of objects that are along a projection path extending outward from a surface of the cylindrical texture image away from a center axis of the cylindrical texture image. In another example, a spherical texture image may be used to depict at least a portion of an object, within the geometry, that is at least partially surrounded by the spherical texture image (e.g., a pixel of the spherical texture image may have a projection path that is substantially towards a center point of the spherical texture image).

In an example, one or more view directions may be defined for inclusion within a texturing image set based upon the one or more view directions corresponding to texture images that texture the geometry, within the undersampling threshold, above a total percentage of texture geometry pixels. For example, at least 90% of the geometry is to be textured by one or more texture images. The texturing image set may comprise one or more view directions that may provide relatively high non-redundant texturing coverage for the geometry (e.g., the initial view direction may texture 55% of the geometry; the first view direction may texture 20% of the geometry not already textured by the initial view direction; a second view direction may texture 10% of the geometry not already textured by the initial view direction and/or the first view direction; and a third view direction may texture 5% of the geometry not already textured by the initial view direction, the first view direction, and/or the second view direction). For example, a second non-textured portion of the geometry that is not textured by the initial texture image and/or the first texture image may be identified. A second view direction for a second texture image may be defined based upon a second coverage metric associated with an amount of the second non-textured portion that is textured, within the undersampling threshold, by the second texture image along the second view direction (e.g., the second view direction may provide relatively greater texturing coverage of the second non-textured portion than other view directions). In this way, one or more texture images, depicting the scene from the selectively identified view directions, may be streamed to a client for client-side texturing of the geometry to create a rendered image comprising a three-dimensional representation of the scene. At 108, the method ends.

Figure 2:
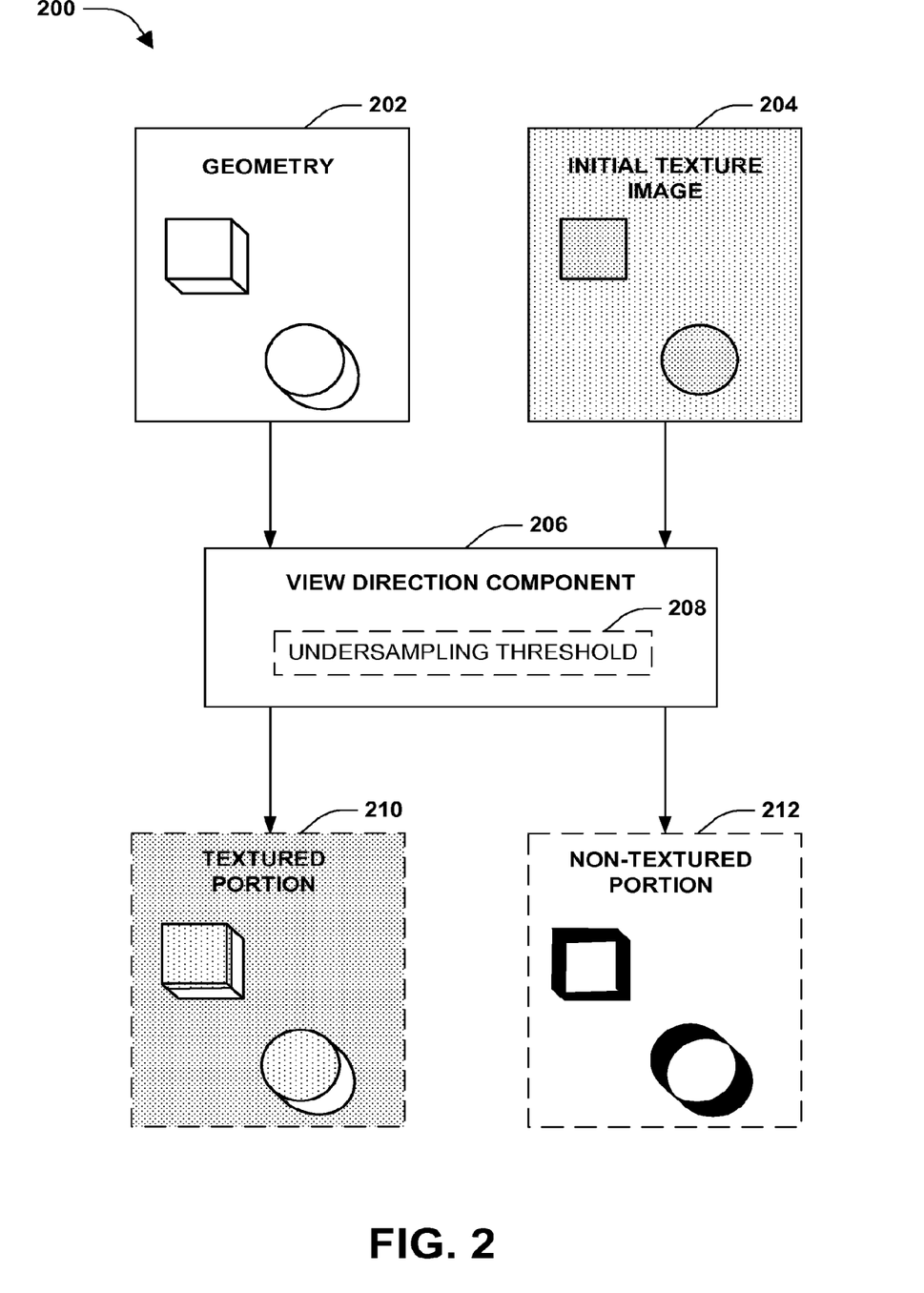
FIG. 2 is a component block diagram illustrating an exemplary system for defining a view direction for a texture image used to texture a geometry.

FIG. 2 illustrates an example of a system 200 configured for defining a view direction for a texture image used to texture a geometry 202. In an example, the geometry 202 comprises a three-dimensional representation of a scene comprising a building and a cylindrical tower. The system 200 may comprise a view direction component 206. The view direction component 206 may maintain an undersampling threshold 208 that may specify a number of geometry pixels within the geometry 202 that may be textured by a single pixel within a texture image, such as an initial texture image 204 (e.g., a pixel may be "stretched" to texture up to 3 geometry pixels).

The initial texture image 204 may depict the scene from a top-down view (e.g., a NADIR image depicting the building and the cylindrical tower from a plumb-line view direction), such that the initial texture image 204 may be capable of texturing a square roof of the building, a circular roof of the cylindrical tower, and ground surrounding the building and the cylindrical tower. In this way, the view direction component 206 may apply the initial texture image 204 to the geometry 202 to identify a textured portion 210 of the geometry 202 and/or a non-textured portion 212 of the geometry 202. The textured portion 210 may comprise one or more geometry pixels that are textured within the undersampling threshold 208 by the initial texture image 204. For example, the ground, the square roof, and the circular roof may be directly textured by the initial texture image 204, while a first portion of a southern side of the building (e.g., an upper portion of the southern side) and a first portion of an eastern side of the building (e.g., an upper portion of the eastern side) may be textured by "stretching" one or more pixels of the initial texture image 204 within the undersampling threshold 208. The non-textured portion 212 may comprise a second portion of the southern side (e.g., a lower portion of the southern side), a second portion of the eastern side (e.g., a lower portion of the eastern side), a northern side of the building, a western side of the building, and a vertical side of the cylindrical tower.

Figure 3:
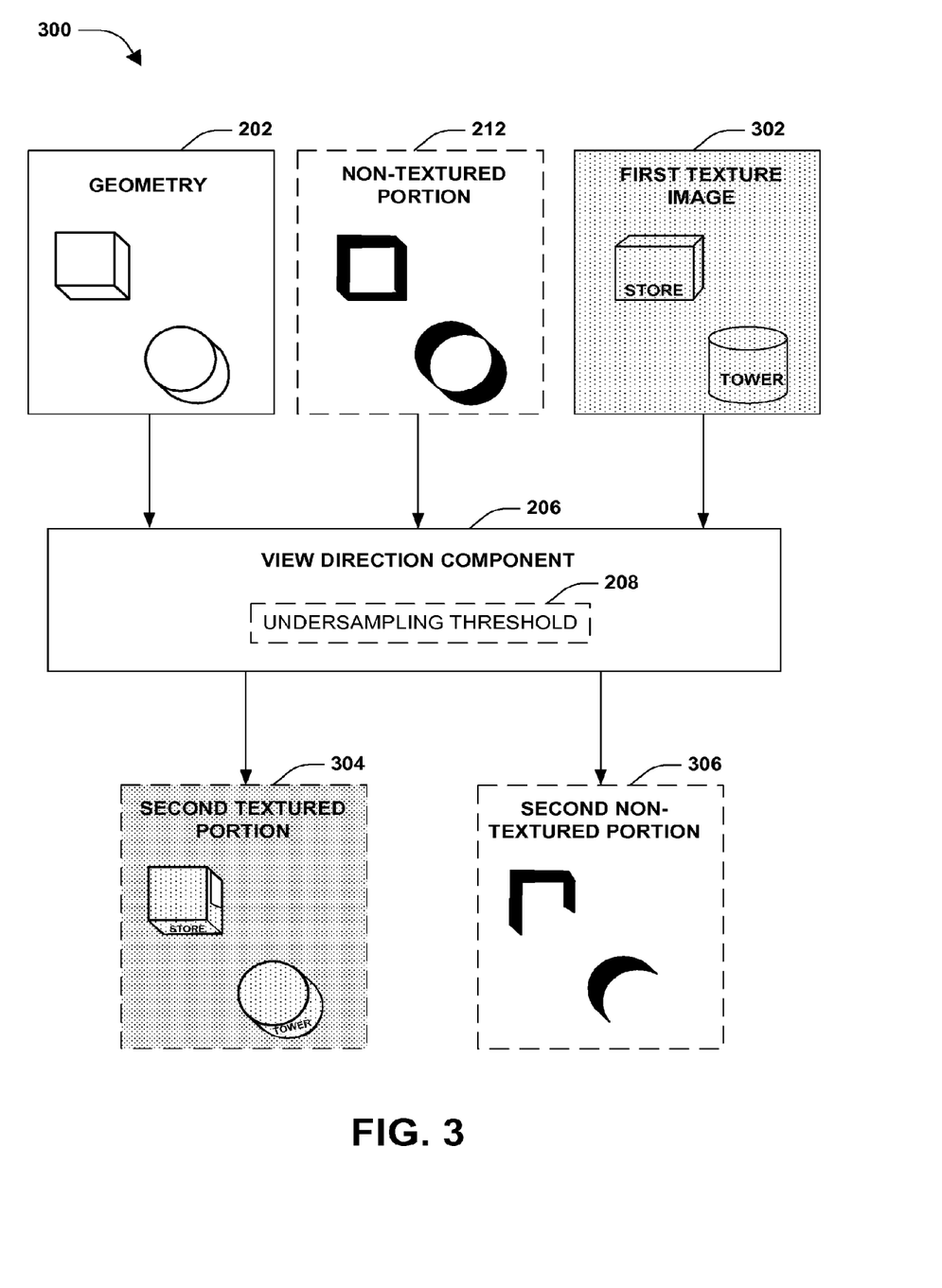
FIG. 3 is a component block diagram illustrating an exemplary system for defining a view direction for a texture image used to texture a geometry.

FIG. 3 illustrates an example of a system 300 configured for defining a view direction for a texture image used to texture a geometry 202. It may be appreciated that in one example, the system 300 corresponds to the system 200. For example, the system 200 comprises a view direction component 206. The view direction component 206 may have applied an initial texture image (e.g., initial texture image 204 of FIG. 2) to the geometry 202 to identify a non-textured portion 212. The view direction component 206 may be configured to define a view direction for a first texture image 302, such as a relatively northern facing view direction at 30 degrees above a horizontal plane of the scene (e.g., the first texture image 302 depicts a southern side of the building comprising a sign "store", a portion of an eastern side of the building, a southern vertical side of the cylindrical tower comprising a sign "tower", and/or other portions of the scene). In an example, the view direction component 206 may define the first view direction based upon a first coverage metric associated with an amount of the non-textured portion 212 that is textured, within an undersampling threshold 208, by the first texture image 302 along the first view direction. In an example, the view direction component 206 may utilize a surface orientation histogram parameterized by a theta and a phi to identify a fraction of remaining untextured surface area of a scene represented by the geometry 202 (e.g., untextured geometry) that is textured by a texture image within the undersampling threshold 208. For example, theta and phi may be assigned values, such that a lower portion of the southern side of the building, the portion of the eastern side of the building, the southern vertical side of the cylindrical tower, and/or other portions of the scene not already textured by the initial texture image may be textured by the first texture image 302, thus resulting in a second textured portion 304 and/or a second non-textured portion 306 of the geometry 202. In this way, one or more additional view directions for one or more additional texture images may be defined in order to texture the geometry 202 (e.g., texture at least a portion of the second non-textured portion 306 not already textured by the initial texture image and/or the first texture image 302) utilizing a relatively efficient number of texture images and/or pixels, which may result in reduced storage and/or bandwidth utilization during streaming to a client for client-side texturing and/or rendering.

Figure 4:
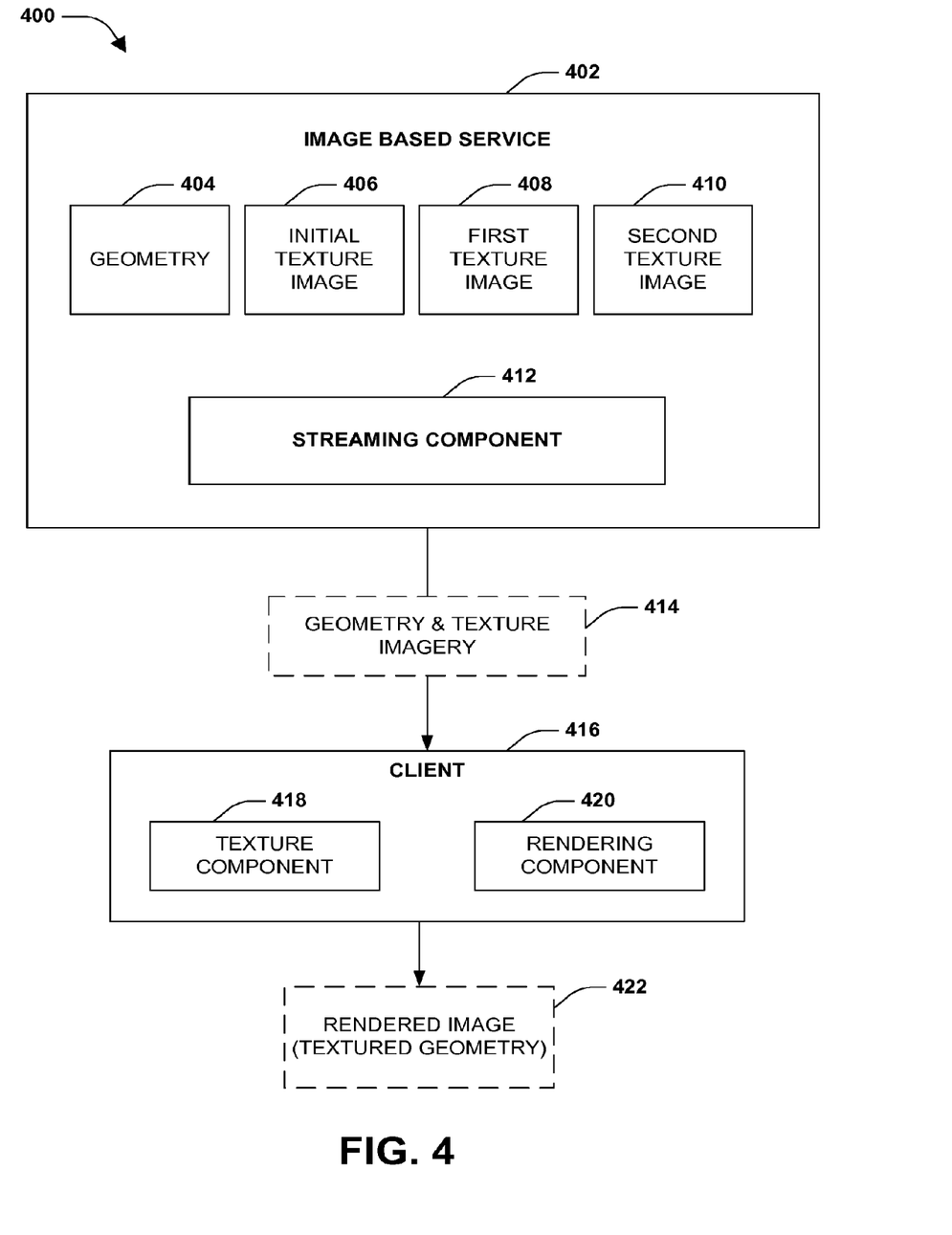
FIG. 4 is a component block diagram illustrating an exemplary system for streaming geometry and texture imagery to a client for client-side texturing and/or rendering.

FIG. 4 illustrates an example of a system 400 configured for streaming 414 geometry and/or texture imagery to a client 416 for client-side texturing and/or rendering. The system 400 may comprise a streaming component 412 associated with an image based service 402 (e.g., a mapping service, a social network, a video game, a networked video game, a 3D modeling service, etc.). The streaming component 412 may be associated with geometry 404 comprising a three-dimensional representation of a scene, such as a city. An initial texture image 406, a first texture image 408, and/or a second texture image 410 may have been identified based upon a texturing image set comprising one or more view directions along with respective texture images can be projected to texture the geometry 404 (e.g., FIG. 2 and/or FIG. 3). The streaming component 412 may be configured to stream 414 the geometry and/or texture imagery (e.g., 406, 408, 410) to the client 416 (e.g., based upon a request from a mapping application hosted by the client 416). A texture component 418 may be configured to texture the geometry 404 using the texture imagery to create textured geometry, and a rendering component 420 may be configured to display a rendered image 422 (e.g., a textured three-dimensional representation of the scene) based upon the textured geometry.

Figure 5:
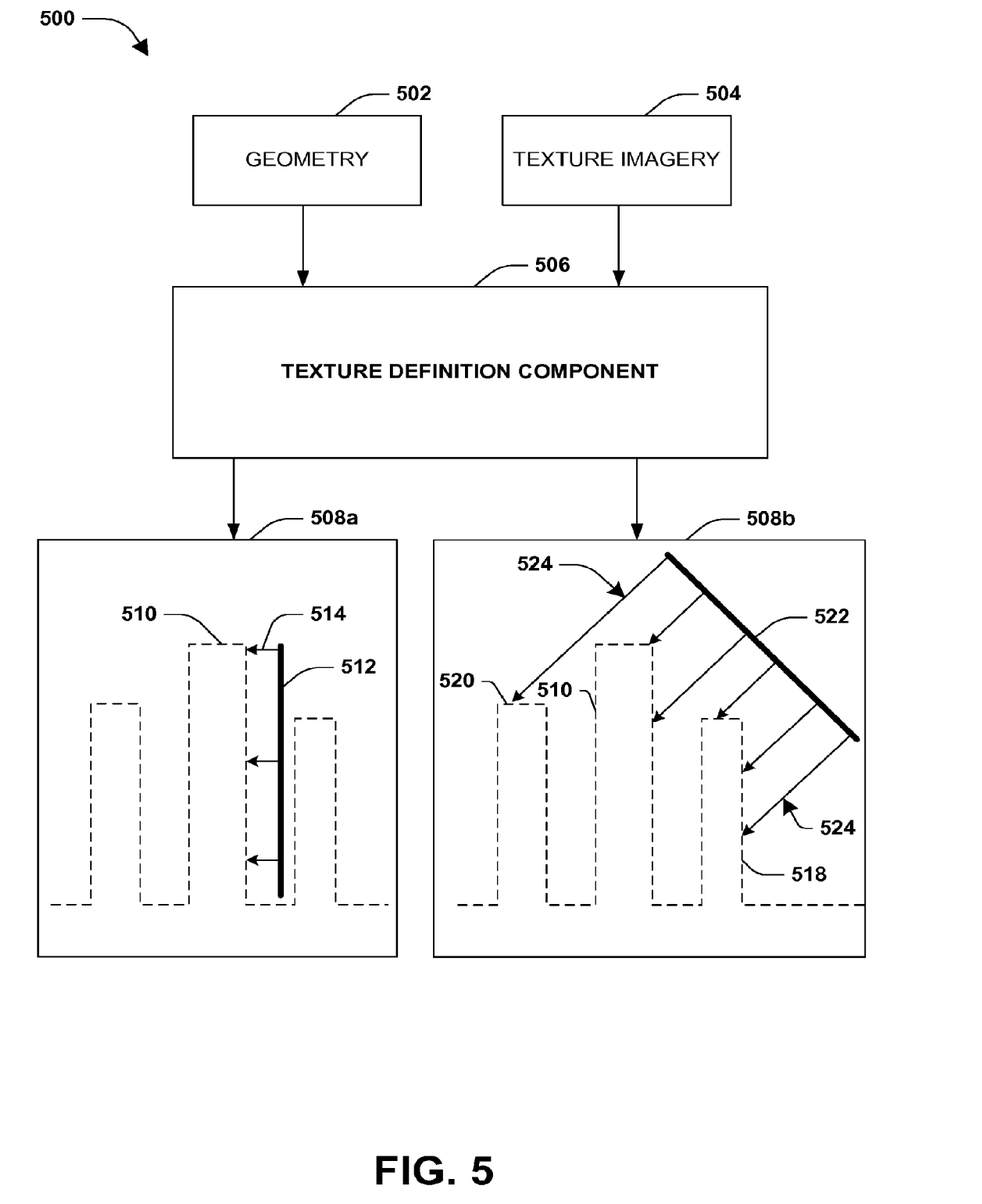
FIG. 5 is a component block diagram illustrating an exemplary system for defining a texture image.

FIG. 5 illustrates an example of a system 500 configured for defining a texture image 512. The system 500 may comprise a texture definition component 506. The texture definition component 506 may be configured to project texture imagery 504 (e.g., one or more images depicting a scene, represented by geometry 502, from various view directions) onto the geometry 502 to generate pre-textured geometry 508a. The texture definition component 506 may be configured to generate a virtual image (e.g., stitched together portions of one or more texture images), as the texture image 512, based upon a surface configuration of an object, such as a building 510, depicted within the geometry 502. That is, the pre-textured geometry 508a may depict a textured surface of the building 510, such that the texture image 512 may be defined as a vertical texture image depicting a façade of the building 510 from a substantially parallel view direction 514 relative to the façade. In this way, a customized virtual image may be generated as the texture image 512 based upon a surface configuration of the building 510 (e.g., where the texture image 512 may be efficiently sent to a client for client-side texturing and/or rendering, such as illustrated and/or described with respect to FIG. 4, for example).

In another example of generating pre-textured geometry 508b, the texture definition component 506 may generate a second virtual image (e.g., stitched together portions of one or more texture images), as the second texture image 522. For example, the second texture image 522 may be oriented according to an angle from a ground plane, such as at a 45 degree angle. The second texture image may depict at least a portion of the building 510, a second building 520, and/or a third building 518 from a view direction 524 extending from a surface normal of the second texture image 522 towards the buildings. It may be appreciated that in this example there is no geometry behind the second texture image 522 (e.g., whereas the third building 518 is situated behind the texture image 512 in the example of the preceding paragraph).

Figure 6:
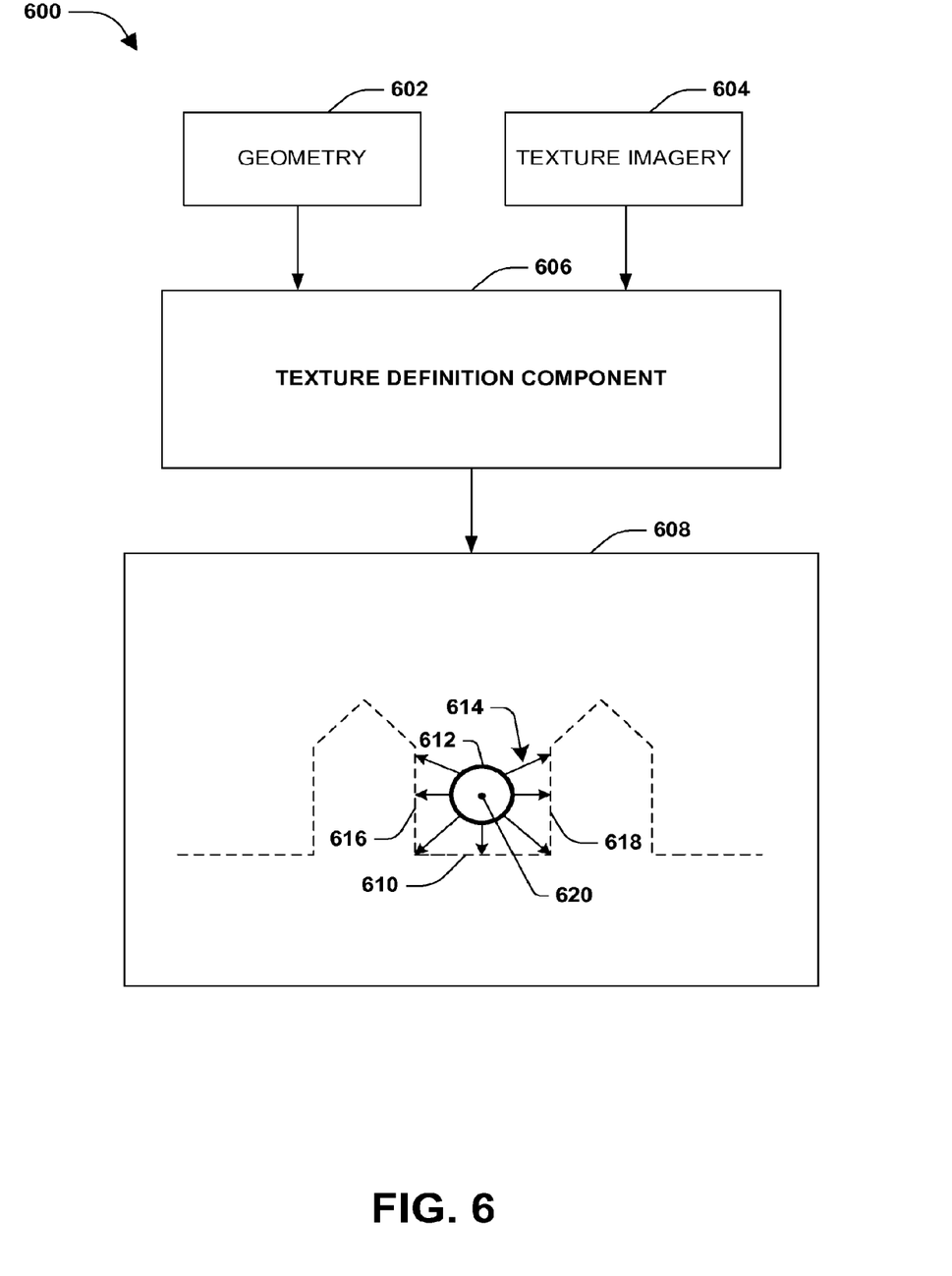
FIG. 6 is a component block diagram illustrating an exemplary system for defining a texture image.

FIG. 6 illustrates an example 600 of a system 600 configured for defining a texture image 612. The system 600 may comprise a texture definition component 606. The texture definition component 606 may be configured to project texture imagery 604 (e.g., one or more images depicting a scene, represented by geometry 602, from various view directions) onto the geometry 602 to generate pre-textured geometry 608. The texture definition component 606 may be configured to generate a virtual image (e.g., stitched together portions of one or more texture images), as the texture image 612, based upon a surface configuration of one or more objects, such as a street 610, a first façade 616 of a first building, and a second façade 618 of a second building, depicted within the geometry 602. That is, the pre-textured geometry 608 may depict a textured surface of objects along the street 610, such that the texture image 612 may be defined as a cylindrical texture image depicting the street 610, the first façade 616, and the second façade 618 along a projection path 614 extending outward from a surface of the cylindrical texture image 612 away from a center axis 620 (e.g., into/out of the page) of the cylindrical texture image 612. In this way, a customized virtual image may be generated as the texture image 612 based upon a surface configuration of the street 610, the first building, and/or the second building (e.g., where the texture image 612 may be efficiently sent to a client for client-side texturing and/or rendering, such as illustrated and/or described with respect to FIG. 4, for example).

Figure 7:
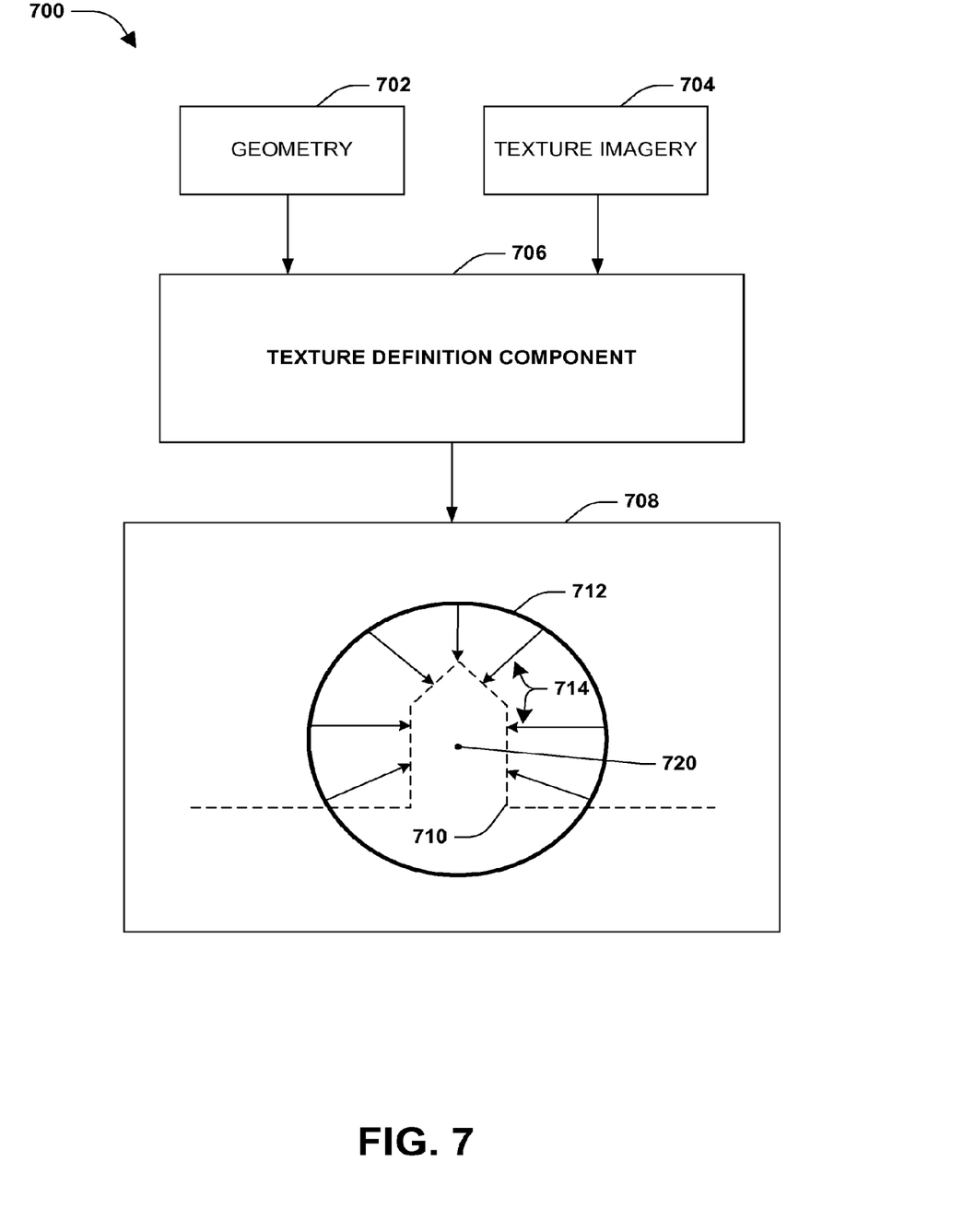
FIG. 7 is a component block diagram illustrating an exemplary system for defining a texture image.

FIG. 7 illustrates an example of a system 700 configured for defining a texture image 712. The system 700 may comprise a texture definition component 706. The texture definition component 706 may be configured to project texture imagery 704 (e.g., one or more images depicting a scene, represented by geometry 702, from various view directions) onto the geometry 702 to generate pre-textured geometry 708. The texture definition component 706 may be configured to generate a virtual image (e.g., stitched together portions of one or more texture images), as the texture image 712, based upon a surface configuration of an object, such as a building 710, depicted within the geometry 702. That is, the pre-textured geometry 708 may depict a textured surface of the building 710, such that the texture image 712 may be defined as a spherical texture image depicting at least a portion of the building 710 along a projection path 714 substantially towards a center point 720 of the spherical texture image 712. In this way, a customized virtual image may be generated as the texture image 712 based upon a surface configuration of the building 710 (e.g., where the texture image 712 may be efficiently sent to a client for client-side texturing and/or rendering, such as illustrated and/or described with respect to FIG. 4, for example).

Figure 8:
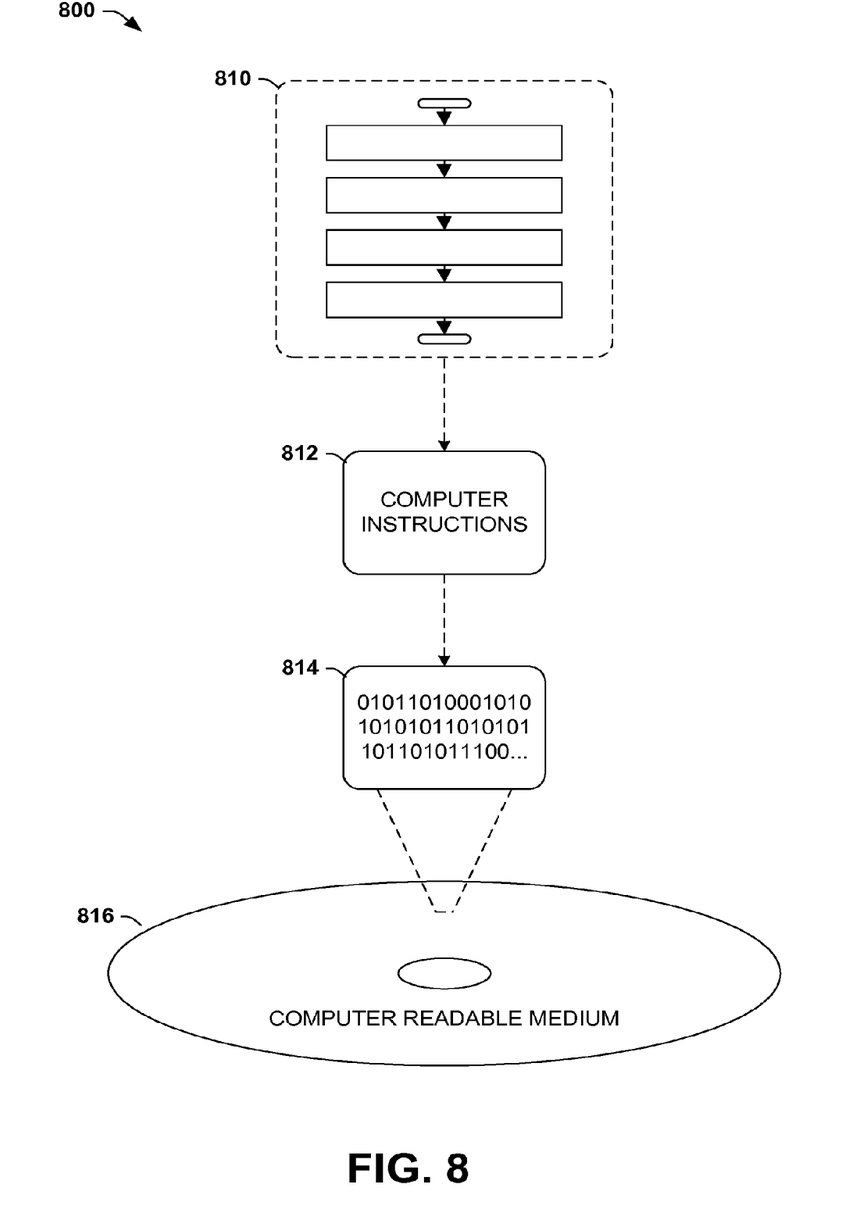
FIG. 8 is an illustration of an exemplary computing device-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 814. This computer-readable data 814 in turn comprises a set of computer instructions 812 configured to operate according to one or more of the principles set forth herein. In one such embodiment 800, the processor-executable computer instructions 812 may be configured to perform a method 810, such as at least some of the exemplary method 100 of FIG. 1, for example. In another such embodiment, the processor-executable instructions 812 may be configured to implement a system, such as at least some of the exemplary system 200 of FIG. 2, at least some of the exemplary system 300 of FIG. 3, at least some of the exemplary system 400 of FIG. 4, at least some of the exemplary system 500 of FIG. 5, at least some of the exemplary system 600 of FIG. 6, and/or at least some of the exemplary system 700 of FIG. 7, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
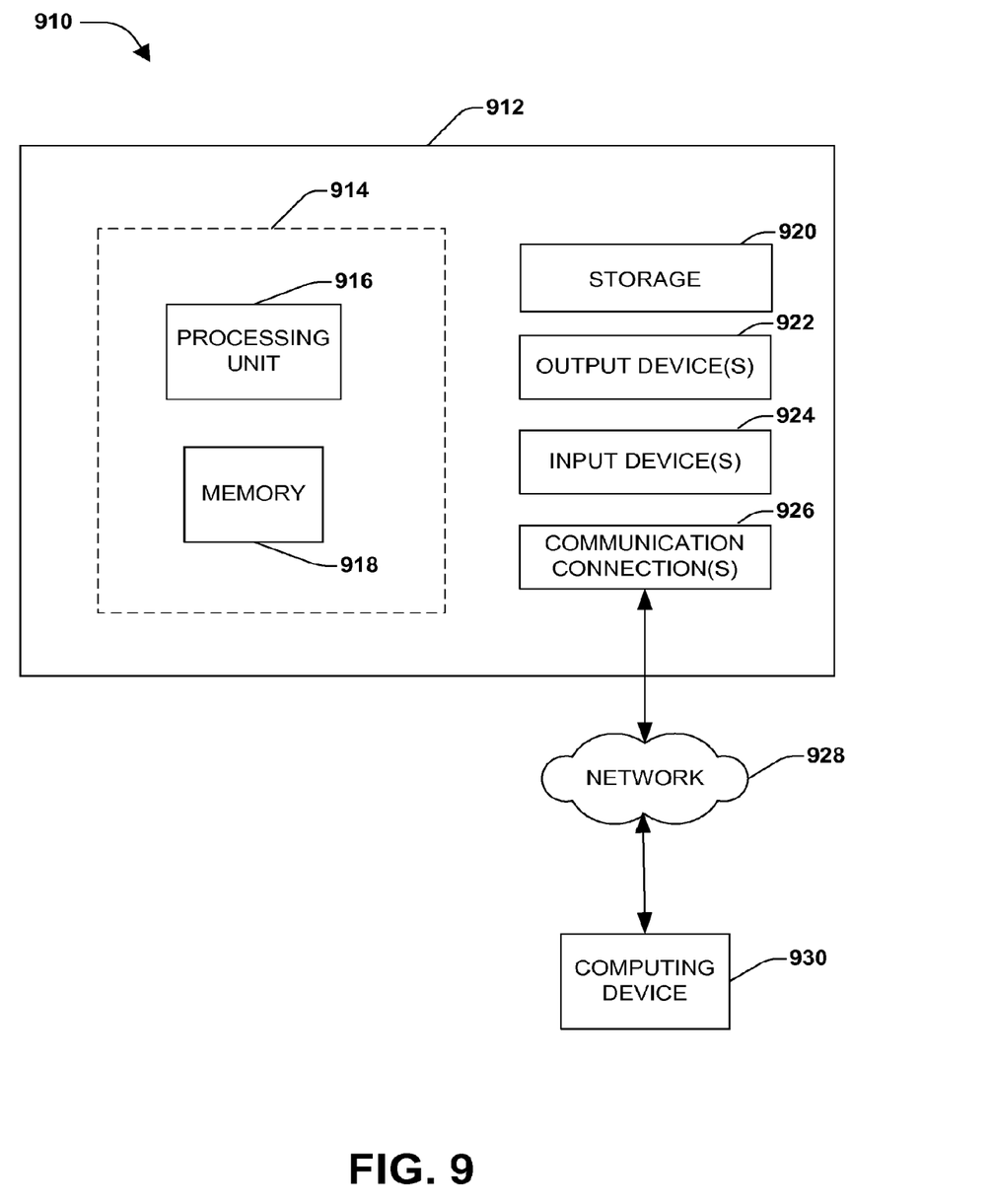
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-implemented method comprising:
    applying an image in a first view direction to a three-dimensional surface;
    identifying a non-textured portion of the three-dimensional surface in response to application of the image in the first view direction;
    determining a second view direction of the image using a coverage metric evaluating an amount of the non-textured portion that can be modified using the second view direction; and
    applying the image in the second view direction to modify the non-textured portion of the three-dimensional surface.

2. The computer-implemented method according to claim 1, further comprising modifying pixels of the three-dimensional surface based on the applying of the image in the first view direction.

3. The computer-implemented method according to claim 1, further comprising texturing pixels of the three-dimensional surface based on the applying of the image in the first view direction.

4. The computer-implemented method according to claim 2, further comprising transmitting a representation of the three-dimensional surface to a client computing device.

5. The computer-implemented method according to claim 1, further comprising displaying the three-dimensional surface on a display connected with a computing device.

6. The computer-implemented method according to claim 1, further comprising identifying another non-textured portion of the three-dimensional surface in response to application of the image in the second view direction, selectively determining a third view direction of the image using a coverage metric evaluating an amount of the another non-textured portion that can be modified using the third view direction, and applying the image in at least a third view direction to the three-dimensional surface to texture pixels of the another non-textured portion.

7. The computer-implemented method according to claim 1, wherein the identifying of the non-textured portion of the three-dimensional surface further comprises using an under-sampling threshold determination to identify un-textured pixels of the non-textured portion.

8. The computer-implemented method according to claim 1, wherein the second view direction of the image is selectively determined using a surface orientation histogram associated with the three-dimensional surface.

9. The computer-implemented method according to claim 1, wherein applying the image in the second view direction further comprises generating a virtual image based upon overlap associated with a projection of the image in the first view direction and a projection of the image in the second view direction, and texturing one or more pixels of the non-textured portion using the generated virtual image.

10. A system comprising:
   at least one processor; and
   a memory operatively connected with the processor, wherein the memory stores computer-readable instructions that when executed on the processor, causes the processor to perform:
      applying an image in a first view direction to a three-dimensional surface,
      identifying a non-textured portion of the three-dimensional surface in response to application of the image in the first view direction,
      determining a second view direction of the image using a coverage metric evaluating an amount of the non-textured portion that can be modified using the second view direction, and
      rendering the three-dimensional surface, wherein the rendering comprises texturing pixels of the non-textured portion based on applying the image in the second view direction.

11. The system according to claim 10, wherein the computer-readable instructions further comprise an instruction to perform modifying pixels of the three-dimensional surface based on the applying of the image in the first view direction.

12. The system according to claim 10, wherein the computer-readable instructions further comprise an instruction to perform texturing pixels of the three-dimensional surface based on the applying of the image in the first view direction.

13. The system according to claim 10, wherein the computer-readable instructions further comprise an instruction to perform at least one selected from a group consisting of: transmitting the three-dimensional surface to a client computing device, and displaying the three-dimensional surface on a display connected with the system.

14. The system according to claim 10, wherein the computer-readable instructions further comprise an instruction to perform identifying another non-textured portion of the three-dimensional surface in response to application of the image in the second view direction, selectively determining a third view direction of the image using a coverage metric evaluating an amount of the another non-textured portion that can be modified using the third view direction, and applying the image in at least a third view direction to the three-dimensional surface to texture pixels of the another non-textured portion.

15. The system according to claim 10, wherein the identifying of the non-textured portion of the three-dimensional surface further comprises using an under-sampling threshold determination to identify un-textured pixels of the non-textured portion.

16. The system according to claim 10, wherein the second view direction of the image is selectively determined using a surface orientation histogram associated with the three-dimensional surface.

17. The system according to claim 10, wherein the rendering further comprises generating a virtual image based upon overlap associated with a projection of the image in the first view direction and a projection of the image in the second view direction, and texturing one or more pixels of the non-textured portion using the generated virtual image.

18. A system comprising:
   at least one processor; and
   a memory operatively connected with the processor, wherein the memory stores instructions that when executed on the processor, causes the processor to perform:
      applying a first image in a first view direction to a three-dimensional surface,
      identifying a non-textured portion of the three-dimensional surface in response to application of the image in the first view direction,
      determining a second image having a second view direction for the first image, using a coverage metric evaluating an amount of the non-textured portion that can be modified using the second image, and
      rendering the three-dimensional surface, wherein the rendering comprises texturing pixels of the non-textured portion based on applying the second image in the second view direction to the three-dimensional surface.

19. The system according to claim 18, wherein the rendering further comprises generating a virtual image based upon overlap associated with a projection of the first image in the first view direction and a projection of the second image in the second view direction, and texturing one or more pixels of the non-textured portion using the generated virtual image.

20. The system according to claim 18, wherein the instructions further comprise operations for: identifying another non-textured portion of the three-dimensional surface in response to application of the second image, selectively determining a third view direction of the image using a coverage metric evaluating an amount of the another non-textured portion that can be modified using a third image in a third view direction, and applying the third image in the third view direction to the three-dimensional surface to texture pixels of the another non-textured portion.

* * * * *